J. W. KNOX.
Ore Grinder and Amalgamator.

No. 27,990. Patented April 24, 1860.

Witnesses

Inventor
Israel W. Knox
per Munn & Co
Attorneys

UNITED STATES PATENT OFFICE.

ISRAEL W. KNOX, OF SAN FRANCISCO, CALIFORNIA.

AMALGAMATOR.

Specification of Letters Patent No. 27,990, dated April 24, 1860.

*To all whom it may concern:*

Be it known that I, ISRAEL W. KNOX, of San Francisco, in the county of San Francisco and State of California, have invented a new and Improved Gold-Ore Grinder and Amalgamator; and I do hereby declare that the following is a full, clear, and exact description of the same, reference being had to the annexed drawings, making a part of this specification, in which—

Figure 1:
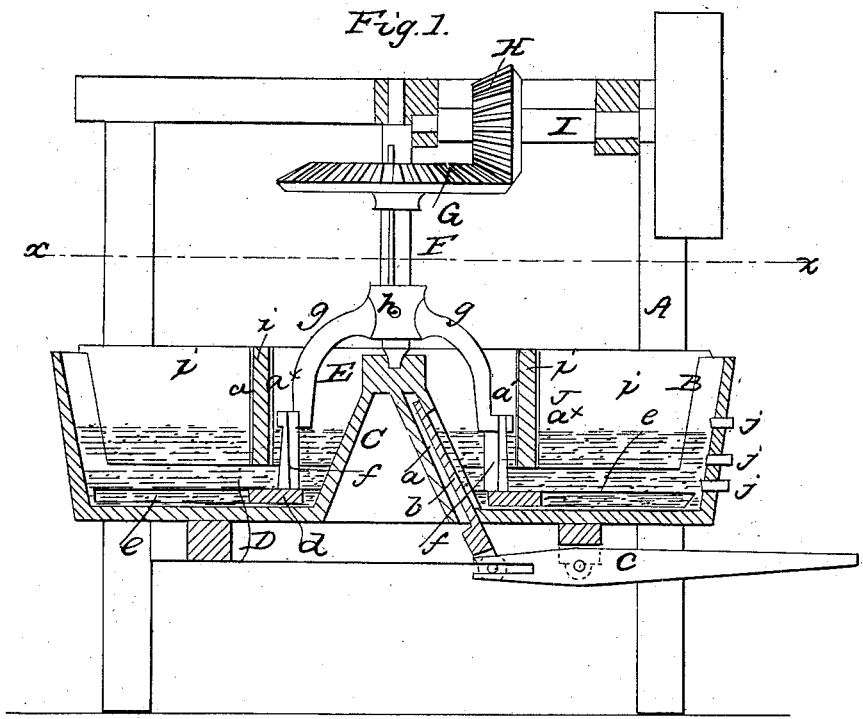
Figure 2:
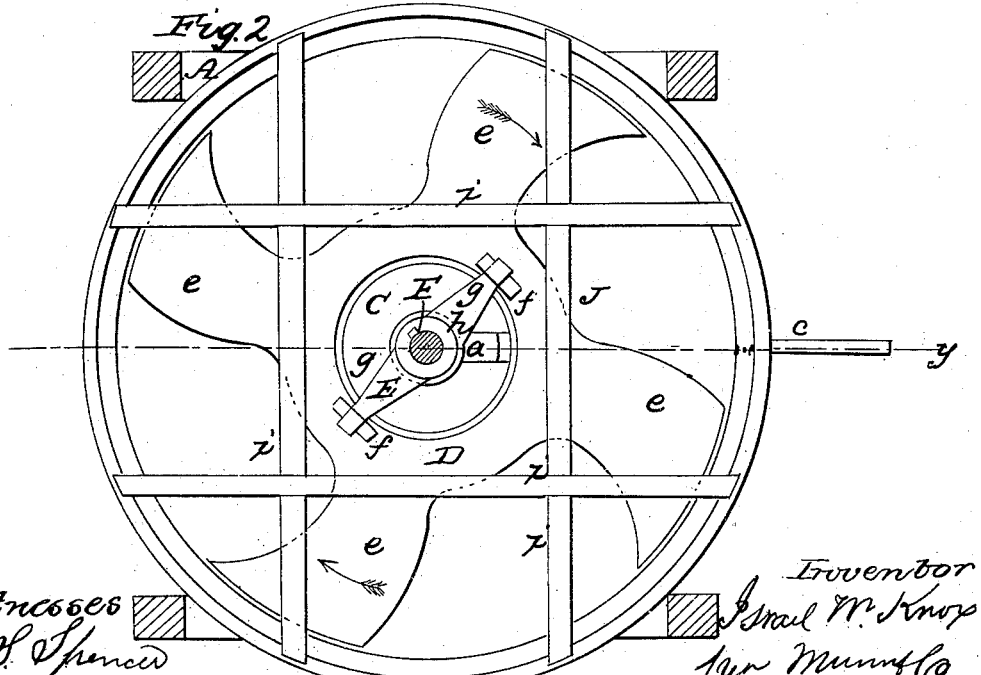

Figure 1, is a vertical section of my invention, taken in the line $y$, $y$, Fig. 2. Fig. 2, a horizontal section of the same, taken in the line $x$, $x$, Fig. 1.

Similar letters of reference indicate corresponding parts in the two figures.

The object of this invention is to obtain a grinder and amalgamator by which the fine particles of gold that have hitherto escaped, in the operation of previously devised machines, may be retained. The invention consists in the employment or use of a stationary pan, provided with a central cone having a discharge opening and gate, and a revolving grinder fitted within the pan, the above parts being also used in connection with a stationary frame covered with copper amalgamated plates, the pan being also lined with the same, whereby the desired end is attained.

To enable those skilled in the art to fully understand and construct my invention I will proceed to describe it.

A represents a rectangular framing in which a cast-iron pan B, is permanently secured. This pan may be of any suitable dimensions with a slightly inclined side as shown clearly in Fig. 1. At the center of the pan B, there is a frustum of a cone C, which may be cast with the pan and having a discharge opening $a$, in it, which opening is covered by a gate $b$, having a lever $c$, connected to its lower end. The pan is lined with copper amalgamated plates and within the pan a cast iron grinder D is fitted, said grinder being formed of an annular plate $d$, which encompasses the conical projection C, and having rings or blades $e$, of slightly curved form as shown clearly in Fig. 2.

The grinder D rests on the bottom of the pan B, and it has two standards $f$, $f$, on its plate $d$, said standards being notched or recessed at their upper ends to receive the ends of a driver E, which is formed of two curved arms $g$, $g$, projecting from a hub $h$, which is fitted on a vertical shaft F, having its lower end stepped on the conical projection C. The hub $h$, is provided internally with a vertical groove, in which a feather on the shaft F fits, to admit of a rising and falling adjusting movement of the hub on the shaft and at the same time causing the driver to be rotated by the shaft.

On the upper part of the shaft F, there is a bevel wheel G with which a bevel pinion H, on a horizontal shaft I, gears, said shaft being fitted in suitable bearings in the framing.

J, is a frame which is fitted in the pan B. This frame is formed of bars or beams $i$, intersecting each other at right angles, and extending down a suitable distance within the pan B. This frame may be of wood and it is covered with copper amalgamated plates, $a^x$.

The operation is as follows: The crushed ore, mercury and water is placed within the pan B, and motion being given the shaft I, by any convenient power, the ore is ground by the grinder D, which rotates in the direction indicated by the arrows Fig. 2, and the gold amalgamated by the mercury. The fine particles of gold that might escape by the ordinary process of amalgamating are caught by the surfaces of the amalgamated plates of frame J, and the lining of pan B, and retained. The pulp is discharged through the opening $a$, by lowering the gate $b$, through the medium of lever $c$. The pan B, may also be provided with cocks $j$, for the convenience of drawing off the pulp when the process of amalgamating has been entirely carried through. By having the gate $b$, arranged over a discharge passage $a$, in the conical projection C, of the pan, the pulp may be very gradually discharged at its surface, and the escape of fine particles of gold prevented. The grinder D performs its work in an efficient manner.

Having thus described my invention what I claim as new, and desire to secure by Letters Patent, is—

1. The grinder D, constructed, and fitted within the pan B, to operate as, and for the purpose set forth.

2. The conical projection C, provided with a discharge opening $a$, and gate $b$, and having a central position within the pan B, to serve as a hub for the grinder D, substantially as shown and described.

3. The employment or use of the frame J, fitted within the pan B, and covered with amalgamated plates, and used with or without the lining of amalgamated plates for the pan, substantially as, and for the purpose set forth.

4. The combination of the pan B, with its conical projection C, and gate *b*, the grinder D, and frame J, covered with the amalgamated plates substantially as, and for the purpose specified.

ISRAEL W. KNOX.

Witnesses:
W. A. PALMER,
W. H. HOWLAND.